(12) United States Patent
Hartel et al.

(10) Patent No.: US 6,983,448 B2
(45) Date of Patent: Jan. 3, 2006

(54) OPEN FRAMEWORK FOR THE DEFINITION OF METADATA

(75) Inventors: John Mark Hartel, Austin, TX (US); Karalee Brown LeBlanc, Austin, TX (US); John Conrad Sanchez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 09/903,726

(22) Filed: Jul. 12, 2001

(65) Prior Publication Data

US 2003/0028549 A1 Feb. 6, 2003

(51) Int. Cl.
*G06F 9/44* (2006.01)
(52) U.S. Cl. .................................. 717/116
(58) Field of Classification Search ............... 717/108, 717/111, 116, 122; 709/203; 707/100, 101, 707/103 R, 104.1, 202–204
See application file for complete search history.

(56) References Cited

U.S. PATENT DOCUMENTS

| | | | |
|---|---|---|---|
| 5,758,348 A | 5/1998 | Neubauer | 707/103 |
| 5,848,273 A | 12/1998 | Fontana et al. | 395/701 |
| 6,108,664 A | 8/2000 | Nori et al. | 707/103 |
| 6,112,207 A | 8/2000 | Nori et al. | 707/101 |
| 6,128,621 A * | 10/2000 | Weisz | 707/103 Y |
| 6,134,559 A | 10/2000 | Brumme et al. | 707/103 |
| 6,477,701 B1 * | 11/2002 | Heistermann et al. | 717/108 |
| 2003/0050932 A1 * | 3/2003 | Pace et al. | 707/100 |
| 2003/0140090 A1 * | 7/2003 | Rezvani et al. | 709/203 |

OTHER PUBLICATIONS

Sun Microsystems, "Version 1.1.8 of Java Platform API Specification": Java Application Programming Interface, System Architecture, 1995-1999, Sun Microsystems, Inc.*

* cited by examiner

*Primary Examiner*—Kakali Chaki
*Assistant Examiner*—Tuan Vu
(74) *Attorney, Agent, or Firm*—Duke W. Yee; Jeffrey S. LaBaw; Cathrine K. Kinslow

(57) ABSTRACT

A family of Java interfaces defines methods to provide common information about a property, such as data type and editing capabilities. The interfaces identify the methods used to get generic metadata. Implementers may extend these classes, as needed, to provide the metadata for their specific properties. The common metadata description interface of the present invention allows multiple metadata sources to be used interchangeably within the same software product without the software code being specifically written for each metadata source.

21 Claims, 3 Drawing Sheets

OPEN FRAMEWORK FOR THE DEFINITION OF METADATA

BACKGROUND OF THE INVENTION

1. Technical Field

The present invention relates to data processing and, in particular, to the definition of metadata in the Java programming language. Still more particularly, the present invention provides an open framework for the definition of metadata.

2. Description of Related Art

Java is a programming language designed to generate applications that can run on all hardware platforms without modification. Java is an interpreted language. The source code of a Java program is compiled into an intermediate language called "bytecode," which cannot run by itself. The bytecode must be converted (interpreted) into machine code at runtime. Upon finding a Java applet, e.g., in a Web page, a Web browser invokes a Java interpreter (Java Virtual Machine (JVM)) which translates the bytecode into machine code and runs it. JVMs are available for most hardware platforms. Thus, Java programs are not dependent on any specific hardware and will run in any computer with the Java Virtual Machine software. On the server side, Java programs can also be compiled into machine language for fastest performance, but they lose their hardware independence as a result.

JavaBeans are a component software architecture that runs in the Java environment. JavaBeans are independent Java program modules that are called for and executed. They have been used primarily for developing user interfaces at the client side. The server-side counterpart is Enterprise JavaBeans (EJBs). Java programs may also reference data sources other than JavaBeans and EJBs. For example, a Java program may reference a database made up of tables. Each source of data may have a different associated metadata. Metadata is data that describes other data. Data dictionaries and repositories are examples of metadata.

With different metadata sources, programmers must anticipate every possible metadata source and write code to communicate properly with each metadata source. If code is written for a plurality of metadata sources, the code may become very complicated. Furthermore, it is impossible to anticipate new metadata formats in the future. If an enterprise wishes to add a new data type and, thus, a new metadata source, the code must be completely rewritten. Therefore, it would be advantageous to provide an open framework for the definition of metadata.

SUMMARY OF THE INVENTION

The present invention provides a family of Java interfaces that define methods to provide common information about a property, such as data type and editing capabilities. The interfaces identify the methods used to get generic metadata. Implementers may extend these interfaces, as needed, to provide the metadata for their specific properties. For example, when a relational database is added, a programmer may write an object descriptor and a property descriptor classes that extend the interfaces. The common metadata description interface of the present invention allows multiple metadata sources to be used interchangeably within the same software product without the software code being specifically written for each metadata source.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
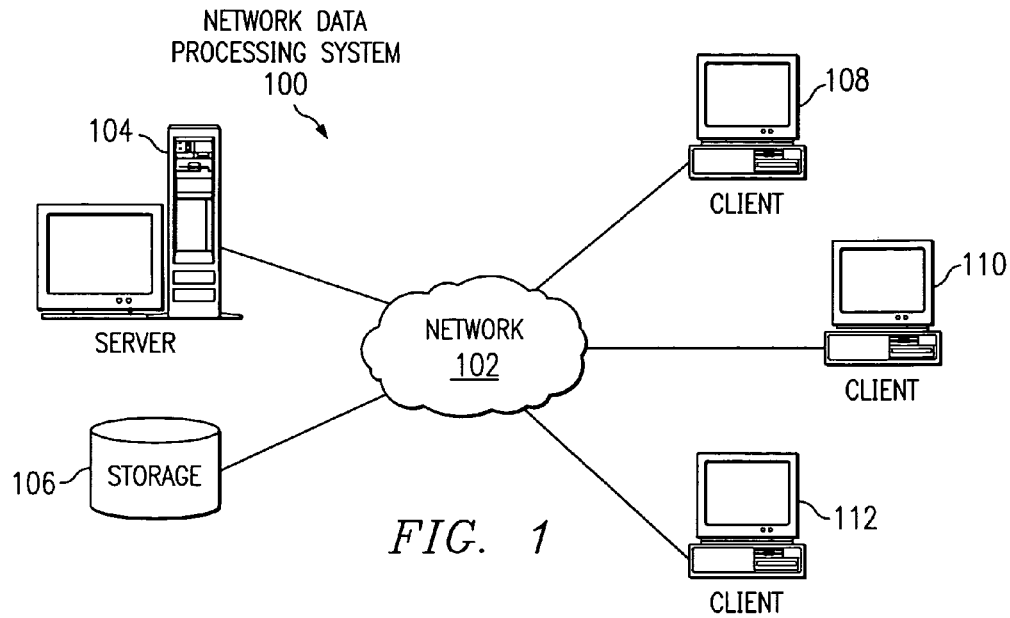
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In accordance with a preferred embodiment of the present invention, Java programs may be called from within HTML documents or launched stand alone within network data processing system 100. When a Java program runs on a client, such as clients 108, 110, 112, it is often called a "Java applet." When it is run on a server, such as server 104, it is called a "servlet."

The present invention provides a family of Java interfaces that define methods to provide common information about a property, such as data type and editing capabilities. Implementers may extend these classes as needed to provide the metadata for their specific properties. For example, one embodiment of the present invention is an implementation that provides metadata descriptions of columns in a database table could be realized using Java DataBase Connectivity. Another example may be an implementation that uses Java introspection to glean metadata information about any bean object. The common metadata description interface of the present invention allows these two implementations to be used interchangeably within the same software product.

Figure 2:
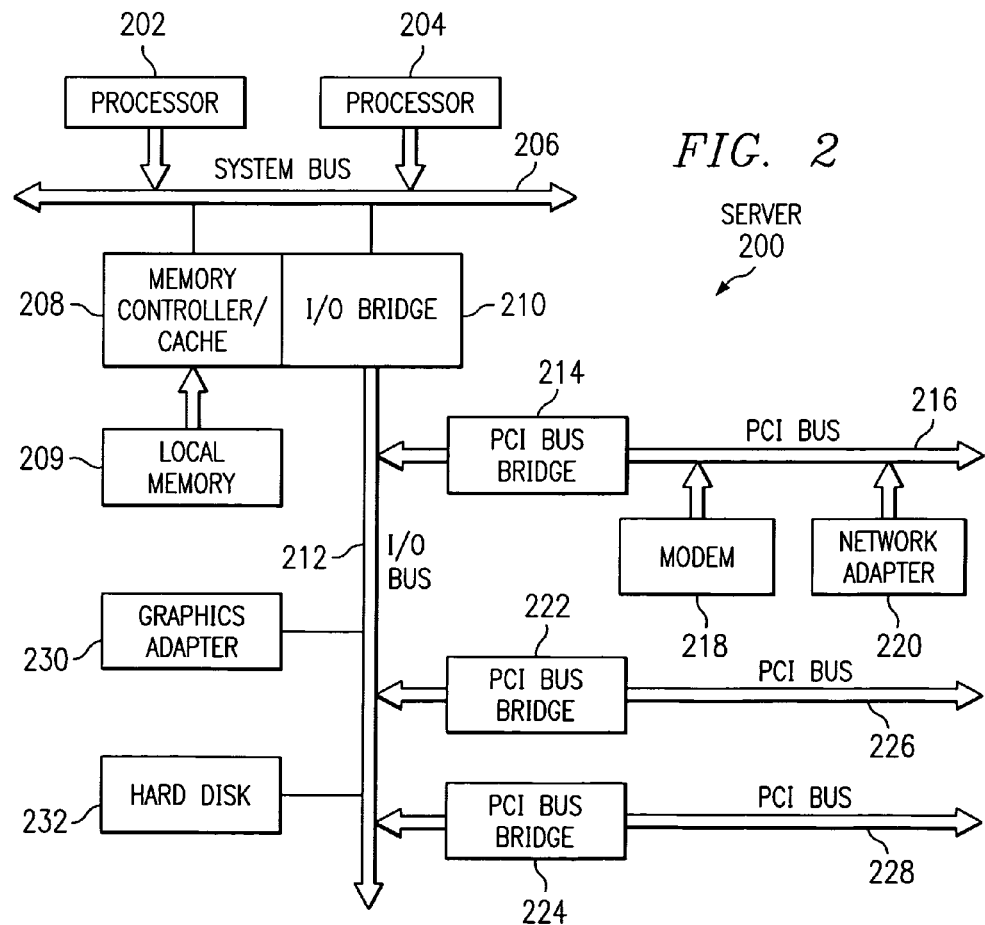
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
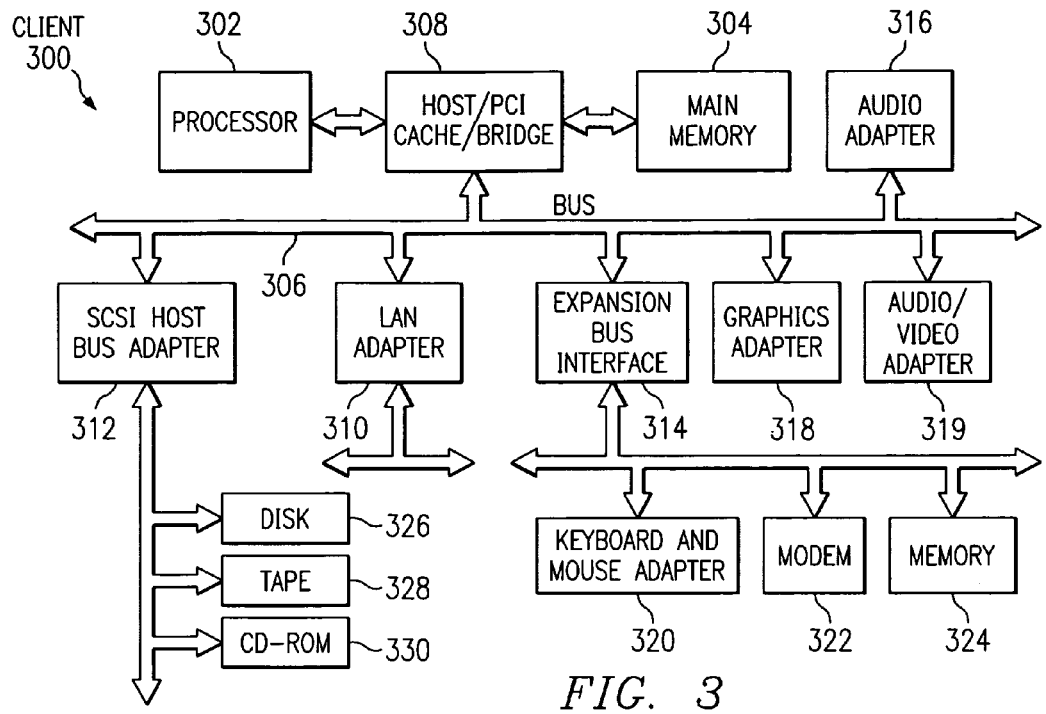
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer. Data processing system 300 also may be a kiosk or a Web appliance.

Figure 4:
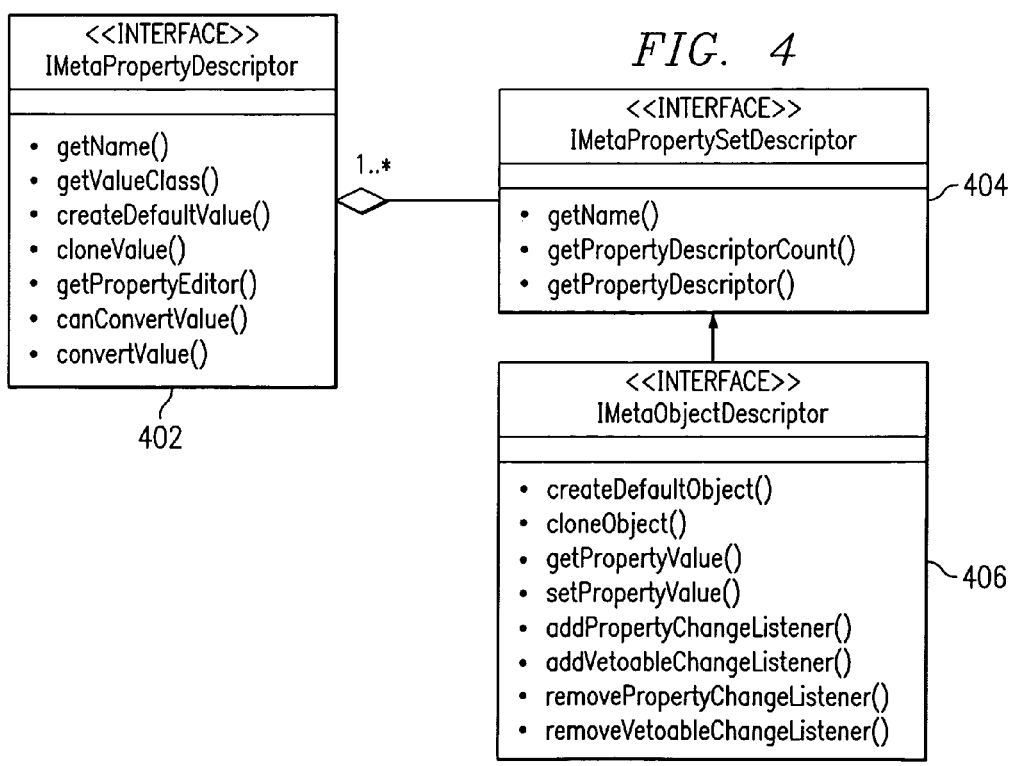
FIG. 4 is a block diagram illustrating the structure of the family of Java interfaces used to provide common information about generic properties in accordance with a preferred embodiment of the present invention.

With reference to FIG. 4, a block diagram illustrating the structure of the family of Java interfaces used to provide common information about generic properties is shown in accordance with a preferred embodiment of the present invention. The interface IMetaPropertyDescriptor 402 defines methods that describe a single property. For example, IMetaPropertyDescriptor may describe one column in a database and the methods defined by the interface may include getName( ), getValueClass( ), createDefaultValue( ), clonevalue( ), getPropertyEditor( ), canConvertValue( ), and convertvalue( ).

The interface IMetaPropertySetDescriptor 404 describes a set of properties, such as a group of columns in a database. The IMetaObjectDescriptor interface 406 extends IMetaPropertySetDescriptor to collect multiple associated property descriptions into a single object description. Interface 404 is a subclass of interface 406. The arrow between interface 402 and 404 represents association. The arrow indicates that an object that implements interface 404 has a one-way association with objects that implement interface 402. Besides inheritance and association, relationships may include aggregation, using, instantiation, and meta-class. The "1 . . . *" indicates the cardinality of the association; a property set is associated with one or more properties. This is a one-to-many association. Other cardinalities may include one-to-one or many-to-many.

The methods of the IMetaProperty Descriptor are as follows:

String getName( )
    Get the programmatic name that identifies this property descriptor;
Class getValueClass( )
    Get the class that represents this property's data type;
Object createDefaultValue( )
    Create a default value of this property;
Object cloneValue(Object value)
    Given a value of the type defined by this property descriptor, clone the value and return a new value of the same type;
boolean canConvertValue(Class valueclass)
    Given a value's data type class, test if the class is convertible to the data type class represented by this property descriptor;
Object convertValue(Object value)
    Given a value, convert it to a value matching the data type class represented by this property descriptor;
PropertyEditor getPropertyEditor( )
    Get the property editor needed to edit a value described by this property descriptor. (For a description of property editors see the SUN Java Bean specification, Java Platform Second Edition, version 1.1 API).

The methods of the IMetaPropertySetDescriptor interface are as follows:

int getPropertyDescriptorCount( )
    Get the number of property descriptors contained by this set descriptor;
IMetaPropertyDescriptor getPropertyDescriptor(int propertyindex)
    Given the index of a property contained within this set, get the property's descriptor;
IMetaPropertyDescriptor getPropertyDescriptor(String propertyName)
    Given the name of a property contained within this set, get the property's descriptor;
String getName( )
    Get the programmatic name that identifies this set of property descriptors.

The methods of the IMetaObjectDescriptor interface are as follows:

Object createDefaultObject( )
    Create an object of the type defined by this object descriptor with all of it's contained properties set to their default values;
Object cloneobject(Object object)
    Given an object represented by this descriptor, clone the object and return a new object of the same type and same contained property values;
Object getPropertyValue(int propertyindex, Object object)
    Given the index of a property contained within this set and the containing object represented by this descriptor, extract the property's value.
Object getPropertyvalue(String propertyName, Object object)
    Given the name of a property contained within this set and the containing object represented by this descriptor, extract the property's value;
void setPropertyValue(int propertyindex, Object object, Object newvalue)
    Given the index of a property contained within this set and the containing object represented by this descriptor and the new property value, set the property to the new value;
void setPropertyValue(String propertyName, Object object, Object newvalue)
    Given the name of a property contained within this set and the containing object represented by this descriptor and the new property value, set the property to the new value;
void addPropertyChangeListener (PropertyChangeListener listener)
    Given a listener of property change events, add it to this object descriptor. (For a description of property change listeners see the SUN Java Bean specification, Java Platform Second Edition, version 1.1 API);
void addPropertyChangeListener(String propertyName, PropertyChangeListener listener)
    Given a listener of property change events and the name of the property, add it to this object descriptor;
void removePropertyChangeListener (PropertyChangeListener listener)
    Given a listener of property change events, remove it from this object descriptor;
void removePropertyChangeListener(String propertyName, PropertyChangeListener listener)
    Given a listener of property change events and the name of the property, remove it from this object descriptor;
void addVetoableChangeListener (VetoableChangeListener listener)
    Given a listener of vetoable change events, add it to this object descriptor. (For a description of vetoable change listeners see the SUN Java Bean specification, Java Platform Second Edition, version 1.1 API);
void addVetoableChangeListener(String propertyName, VetoableChangeListener listener)
    Given a listener of vetoable change events and the name of the property, add it to this object descriptor;
void removeVetoableChangeListener (VetoableChangeListener listener)
    Given a listener of vetoable change events, remove it from this object descriptor;
void removeVetoableChangeListener(String propertyName, VetoableChangeListener listener)

Given a listener of vetoable change events and the name of the property, remove it from this object descriptor.

Figure 5:
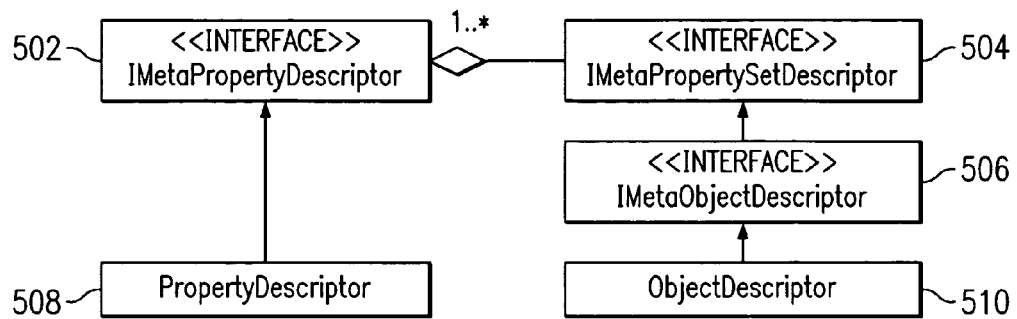
FIG. 5 is a block diagram illustrating an implementation of the common interface in accordance with a preferred embodiment of the present invention.

With reference now to FIG. 5, a block diagram illustrating an implementation of the common interface is shown in accordance with a preferred embodiment of the present invention. The interface IMetaPropertyDescriptor 502 defines methods that describe a single property. The interface IMetaPropertySetDescriptor 504 describes a set of properties, such as a group of columns in a database. The IMetaObjectDescriptor interface 506 collects multiple associated property descriptions into a single object description.

An ObjectDescriptor class 510 that implements the interface IMetaObjectDescriptor is created. For example, if an enterprise uses a relational database, a programmer may create an ObjectDescriptor specifically for the relational database. The ObjectDescriptor includes the actual code for the methods identified in interface 506 and may glean information about an object. Next, a PropertyDescriptor class 508 that implements interface IMetaPropertyDescriptor 502 is created to expose information about each property in the object. In other words, the PropertyDescriptor class includes the actual code for the methods that are identified in the IMetaPropertyDescriptor interface. These methods may be called to return metadata for a property. For example, for a relational database, each property may be represented by a column and the PropertyDescriptor may be written to provide the actual code for the methods identified in interface 502.

Interfaces 502, 504, 506 are universal. ObjectDescriptor and PropertyDescriptor classes are specific to a metadata source. An enterprise may create an OjbectDescriptor and one or more PropertyDescriptors when a metadata source is added. ObjectDescriptor and PropertyDescriptor classes may also be shared between enterprises. In fact, a developer of a data source, such as a database, may write an ObjectDescriptor and appropriate PropertyDescriptors to ship with the product. Once this framework is in place, software may be written as if all the programmer knows is that there is an object that has properties. This simplifies the programming significantly when multiple metadata sources are being used. Furthermore, software written for this open framework may be used even after new data sources are added.

Figure 6:
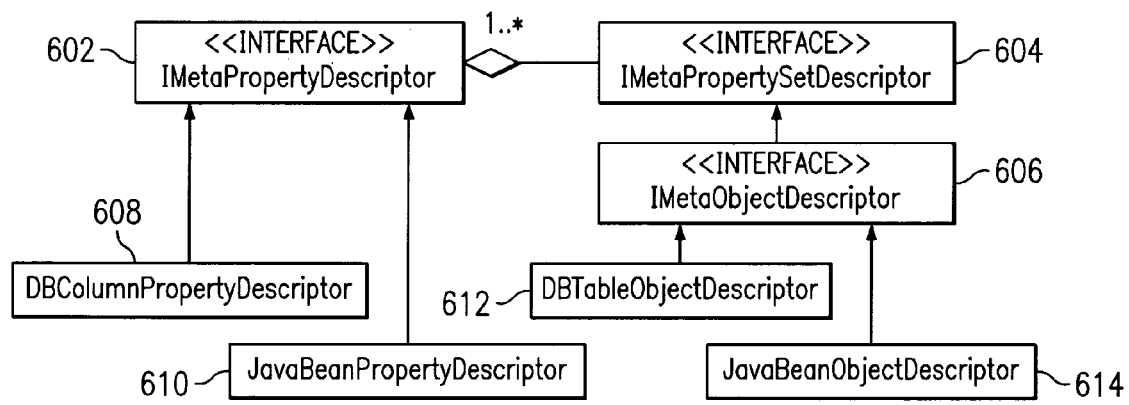
FIG. 6 is an example of an implementation of the common interface in accordance with a preferred embodiment of the present invention.

Turning to FIG. 6, an example of an implementation of the common interface is shown in accordance with a preferred embodiment of the present invention. The interface IMetaPropertyDescriptor 602 defines methods that describe a single property. The interface IMetaPropertySetDescriptor 604 describes a set of properties, such as a group of columns in a database. The IMetaObjectDescriptor interface 606 collects multiple associated property descriptions into a single object description.

A DBTableObjectDescriptor class 612 that implements the interface IMetaObjectDescriptor is created. The DBTableObjectDescriptor class may glean information about the appropriate database table using APIs that talk to the backend database and use the methods defined in interface IMetaObjectDescriptor 606 to expose that information. Next, a DBColumnPropertyDescriptor class 608 that implements the IMetaPropertyDescriptor interface 602 is created to expose information about each appropriate database table column (again using APIs that talk to the backend database) and use the methods defined in interface IMetaPropertyDescriptor 602 to expose that information.

Similarly, a JavaBeanObjectDescriptor class 614 that implements the interface IMetaObjectDescriptor is created. The JavaBeanObjectDescriptor class may glean information about the JavaBean using Java's built-in object introspection mechanism and use the methods defined in interface IMetaObjectDescriptor 606 to expose that information. Next, JavaBeanPropertyDescriptor class 610 that implements the IMetaPropertyDescriptor interface 602 is created to expose information about each property in the JavaBean using Java's built-in method introspection mechanism. Thus, the family of Java interfaces that make up the common interface may be implemented to expose information from multiple metadata sources, in this example one source being a relational database and the other being a Java Bean object.

An example Java program for a property sheet editor written using the open framework of the present invention follows:

```
      // This is an example of a property sheet editor that uses
      // Java interfaces for describing property metadata in a
      // generic way.
1000  public class Example
      {
          // This method loads a set of text field editor GUIs with
          // the values of properties contained within an object
          // whose metadata is described using the
          // "IMetaObjectDescriptor "interface.
1005      public void load(IMetaObjectDescriptor objDesc, Object
             objValue)
          {
              // Loop through all the property descriptors contained
              // within the object descriptor.
1010          for (int i=0; i < objDesc.getPropertyDescriptorcount( );
                 i++)
              {
                  // Get a property descriptor from the object
                  // descriptor.
1015              IMetaPropertyDescriptor propDesc =
                      objDesc.getPropertyDescriptor (i);
                  // Get the programmatic name of the property
                  // descriptor.
1020              String propName = propDesc.getName( );
                  // Extract from the object's value the value of the
                  // property named by the property descriptor.
1025              Object propValue =
                      objDesc.getPropertyValue(propName, objValue);
                  // Get a property editor for the property's value
                  // from the property descriptor.
1030              PropertyEditor propEditor =
                      propDesc.getPropertyEditor( );
                  // Set the property editor to the value of the
                  // property.
                  propEditor.setValue(propValue);
                  // Create a text field editor GUI for the property.
                  JTextField textField = new JTextField( );
                  // Set the text field editor GUI's display text to
                  // the textual representation of the property's
                  // value. (The "getAsText" method of the property
                  // editor performs the conversion to textual
                  // representation.)
                  textField.setText(propEditor.getAsText( ));
                  // Associate the programmatic name of the property
                  // descriptor with the text field editor GUI and
                  // store it in the lookup table so that it can be
                  // accessed later.
1035              textEditors.put(propName, textField);
              }
          }
          // This method saves a set of property values contained
          // within text field editor GUIs to an object whose
          // metadata is described using the "IMetaObjectDescriptor"
          // interface.
1050      public void save(IMetaObjectDescriptor objDesc, Object
             objValue)
          {
              // Loop through all the property descriptors contained
              // within the object descriptor.
```

-continued

```
1055            for (int i=0; i < objDesc.getpropertyDescriptorCount( );
                    i++)
                {
                    // Get a property descriptor from the object
                    // descriptor.
1060                IMetaPropertyDescriptor propDesc =
                        objDesc.getPropertyDescriptor(i);
                    // Get the programmatic name of the property
                    // descriptor.
1065                String propName = propDesc.getName( );
                    // Get a property editor for the property's value
                    // from the property descriptor.
                    PropertyEditor propEditor =
                        propDesc.getPropertyEditor( );
                    // Access the text field editor GUI for the
                    // property descriptor from the lookup table using
                    // the property's programmatic name.
                    JTextField textField =
                        (JTextField)textEditors.get(propName);
                    // Set the property editor to the textual
                    // representation of the property's value from the
                    // text field editor GUI. (The "setAsText" method
                    // of the property editor performs the conversion
                    // from textual representation.)
1070                propEditor.setAsText(textField.getText( ));
                    // Get the new value of the property from the
                    // property editor.
1075                Object propValue = propEditor.getValue( );
                    // Insert the new value of the property named by
                    // the property descriptor into the object's value.
1080                objDesc.setPropertyValue(propName, objValue,
                        propValue);
                }
            }
            // Lookup table structure for storing text field GUIs used
            // to edit property values.
            private HashMap textEditors = new HashMap( );
        }
```

In the example program, line 1000 defines a class. Then, line 1005 defines a method called "load" that takes an ObjectDescriptor and an object as values. In the example shown in FIG. 6, the method may receive DBTableObjectDescriptor and the database as values or the method may receive JavaBeanobjectDescriptor and a JavaBean as values. The "load" method gets the names and values for the object and places them in a graphical user interface for editing.

Next, in line 1010, the program uses the methods in the framework to get the number of properties and loops through the properties. Line 1015 gets the property descriptor from the object descriptor. Line 1020 gets the property name and line 1025 gets the property value. Next, line 1030 gets a property editor from the property descriptor. (For a description of property editors see SUN Java Bean specification, Java Platform Second Edition, version 1.1 API.) This is used to populate a text field user interface widget with a textual representation of the property's value. In line 1035, this text field widget is associated with the property's name and is saved to a lookup table.

Thereafter, line 1050 defines a method called "save" that takes an ObjectDescriptor and an object as values. Next, in line 1055, the program uses the methods in the framework to get the number of properties and loops through the properties. Line 1060 gets the property descriptor from the object descriptor. Line 1065 gets the property name. Next, line 1070 extracts the textual representation of the edited property value from the text field widget that was previously saved to a lookup table and converts it to the property value object using the property editor. Line 1075 gets the property value object from the property editor. Thereafter, in line 1080, the property's new value is saved back into the containing object. This completes the editing process.

As can be seen in the above example, a program may be written without identifying an object type or a metadata source. The example property sheet program may be used for multiple data sources and may be reused in any environment taking advantage of the open framework of the present invention. While the example program is written in Java, other programming languages may be used, such as C++.

Figure 7:
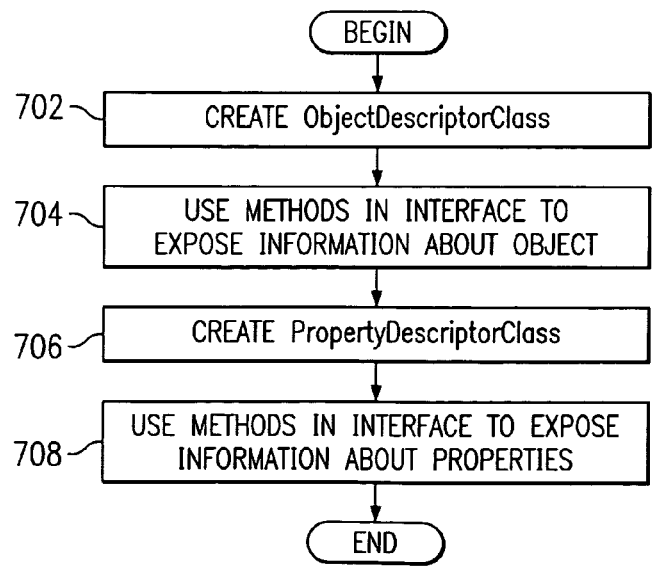
FIG. 7 is a flowchart illustrating the operation of an application implementing the common interface in accordance with a preferred embodiment of the present invention.

With reference now to FIG. 7, a flowchart is shown illustrating the operation of an application implementing the common interface in accordance with a preferred embodiment of the present invention. The process begins and creates an ObjectDescriptor class for an object that implements the interface IMetaObjectDescriptor (step 702). The process uses the methods in the interface to expose information for the object (step 704). Next, the process creates a PropertyDescriptor class for an object that implements the IMetaPropertyDescriptor interface (step 706) and uses the methods in the interface to expose information about each property in the object (step 708). Thereafter the process ends.

Thus, the present invention solves the disadvantages of the prior art by providing a family of Java interfaces that makes up a common interface for multiple metadata sources. Classes that implement these interfaces may extend these classes as needed to provide the metadata for their specific properties. Multiple implementations may be used interchangeably within an application because of the common metadata description provided by the interfaces. This technique is useful in cases in which properties are dynamically created at runtime and, therefore, cannot be described using a concrete bean object defined at compile time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing metadata, comprising:
    providing an object descriptor interface;
    creating an object descriptor class for an object using the object descriptor interface;

using methods defined by the object descriptor interface to identify a property of the object;

providing a property descriptor interface;

creating a property descriptor class using the property descriptor interface; and using methods defined by the property descriptor interface to obtain metadata associated with the identified property.

2. The method of claim 1, wherein the object descriptor interface extends a property set descriptor interface.

3. The method of claim 2, wherein the property set descriptor interface contains the property descriptor interface.

4. The method of claim 1, wherein the property descriptor interface defines methods that describe a single property.

5. The method of claim 1, wherein the object descriptor interface collects multiple associated property descriptions into a single object description.

6. The method of claim 1, wherein the object is a database.

7. The method of claim 6, wherein the step of using methods defined by the object descriptor interface to identify a property of the object comprises using application program interfaces that talk to the database.

8. The method of claim 1, wherein the object is a Java bean.

9. The method of claim 8, wherein the step of using methods defined by the object descriptor interface to identify a property of the object comprises using a built-in object introspection mechanism.

10. The method of claim 1, wherein the metadata describes a data type of the property.

11. The method of claim 1, wherein the metadata describes editing capabilities of the property.

12. An apparatus for providing metadata comprising:

a processor;

first implementation means for providing an object descriptor interface;

first creation means for creating a object descriptor class for an object using the object descriptor interface;

first exposing means for using methods defined by the object descriptor interface to identify a property of the object;

second implementation means for providing a property descriptor interface;

second creation means for creating a property descriptor class using the property descriptor interface; and second exposing means for using methods defined by the property descriptor interface to obtain metadata associated with the identified property.

13. The apparatus of claim 12, wherein the object descriptor interface extends a property set descriptor interface.

14. The apparatus of claim 13, wherein the property set descriptor interface contains the property descriptor interface.

15. The apparatus of claim 12, wherein the property descriptor interface defines methods that describe a single property.

16. The apparatus of claim 12, wherein the object descriptor collects multiple associated property descriptions into a single object description.

17. The apparatus of claim 12, wherein the object is a database.

18. The apparatus of claim 17, wherein the first exposing means comprises means for using application program interfaces that talk to the database.

19. The apparatus of claim 12, wherein the object is a Java bean.

20. The apparatus of claim 19, wherein the first exposing means comprises means fix using a built-in object introspection mechanism.

21. A computer readable medium, for defining metadata, having stored thereon:

instructions for providing an object descriptor interface;

instructions for creating an object descriptor class for an object using the object descriptor interface;

instructions for using methods defined by the object descriptor interface to identify a property of the object;

instructions for providing a property descriptor interface;

instructions for creating a property descriptor class using the property descriptor interface; and instructions for using methods defined by the property descriptor interface to obtain metadata associated with the identified property.

* * * * *

UNITED STATES PATENT AND TRADEMARK OFFICE
CERTIFICATE OF CORRECTION

PATENT NO. : 6,983,448 B2  Page 1 of 1
APPLICATION NO. : 09/903726
DATED : January 3, 2006
INVENTOR(S) : Gusler et al.

It is certified that error appears in the above-identified patent and that said Letters Patent is hereby corrected as shown below:

Col. 12, line 25: before "using" delete "fix" and insert --for--.

Signed and Sealed this

Nineteenth Day of December, 2006

JON W. DUDAS
*Director of the United States Patent and Trademark Office*